UNITED STATES PATENT OFFICE.

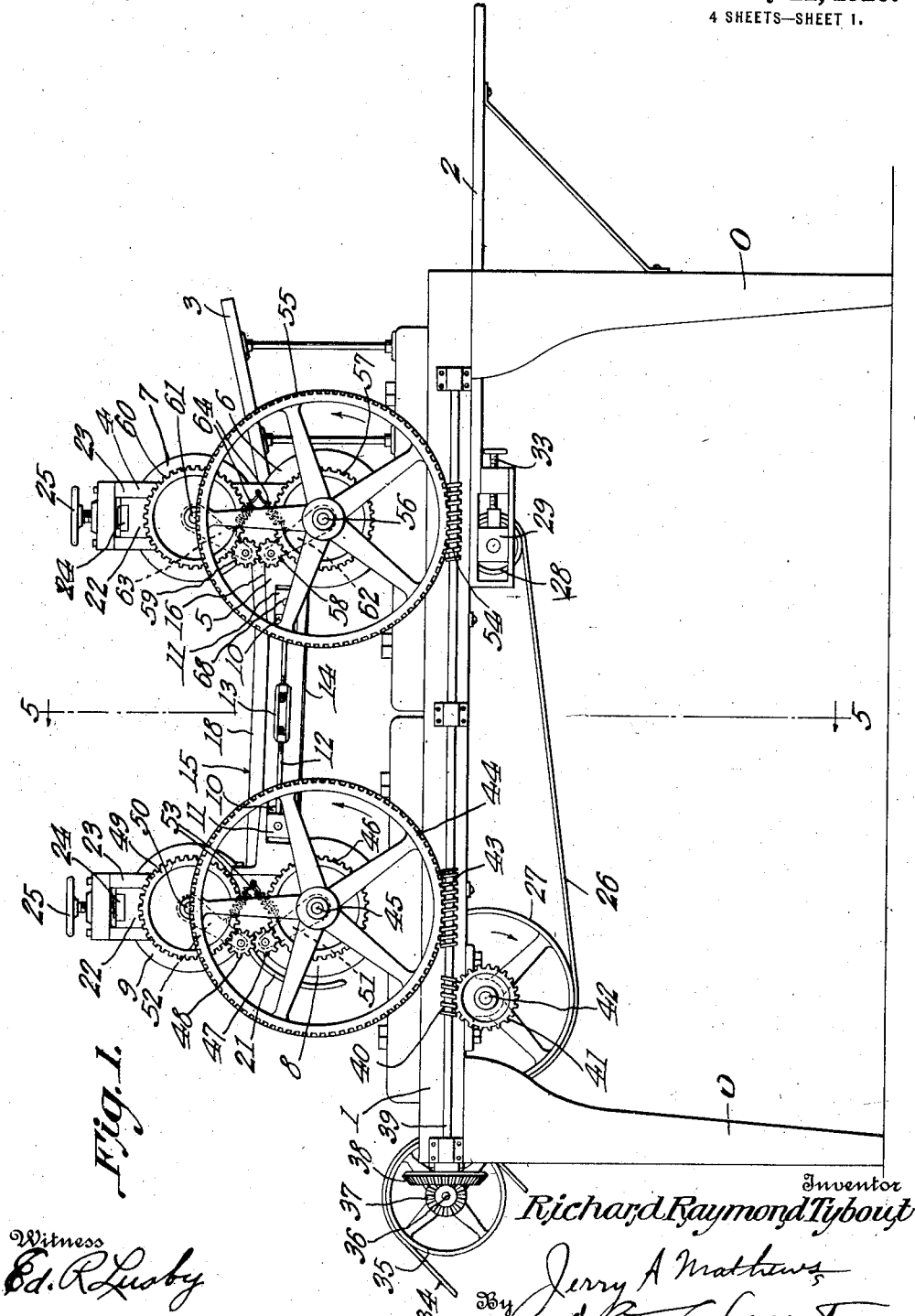

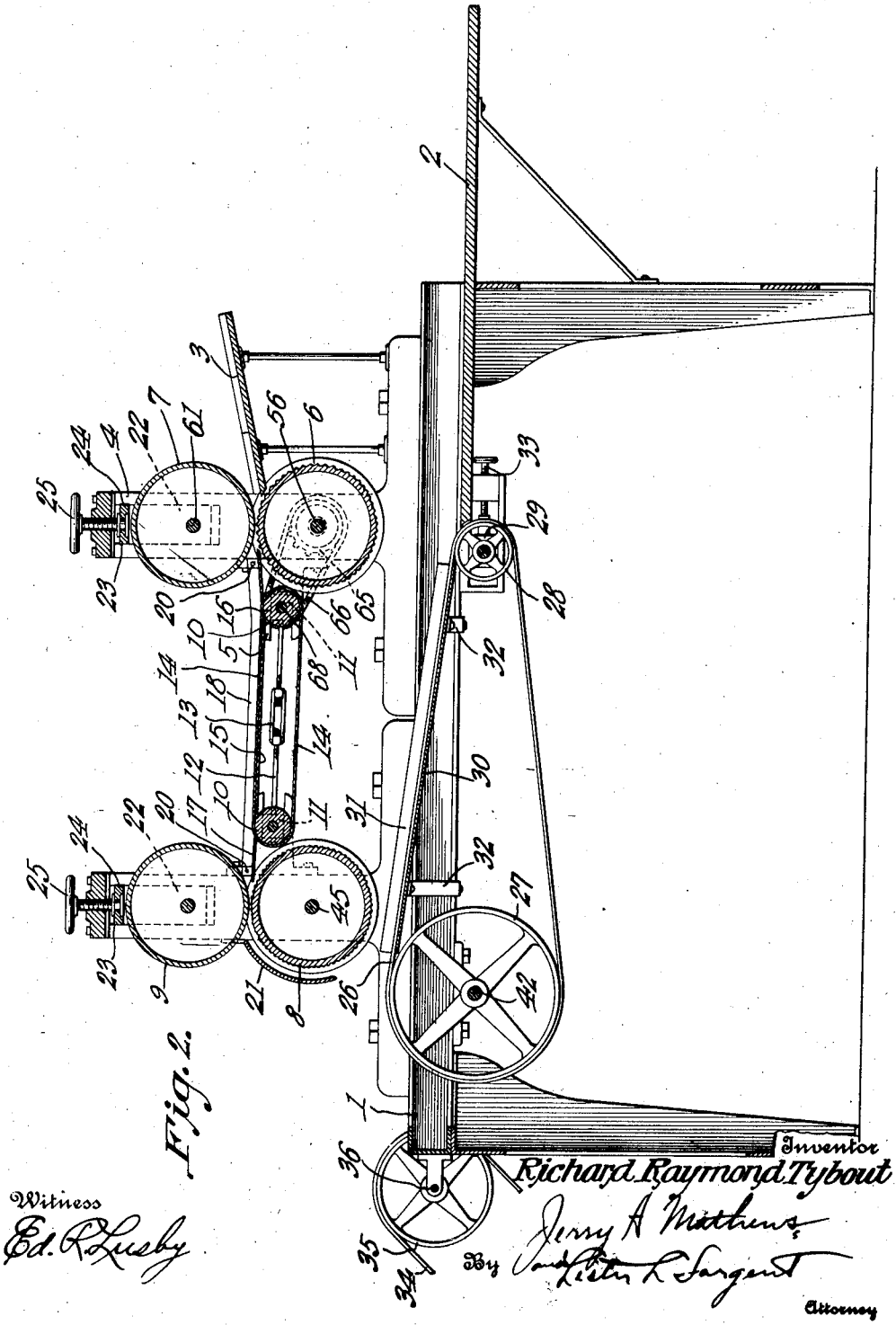

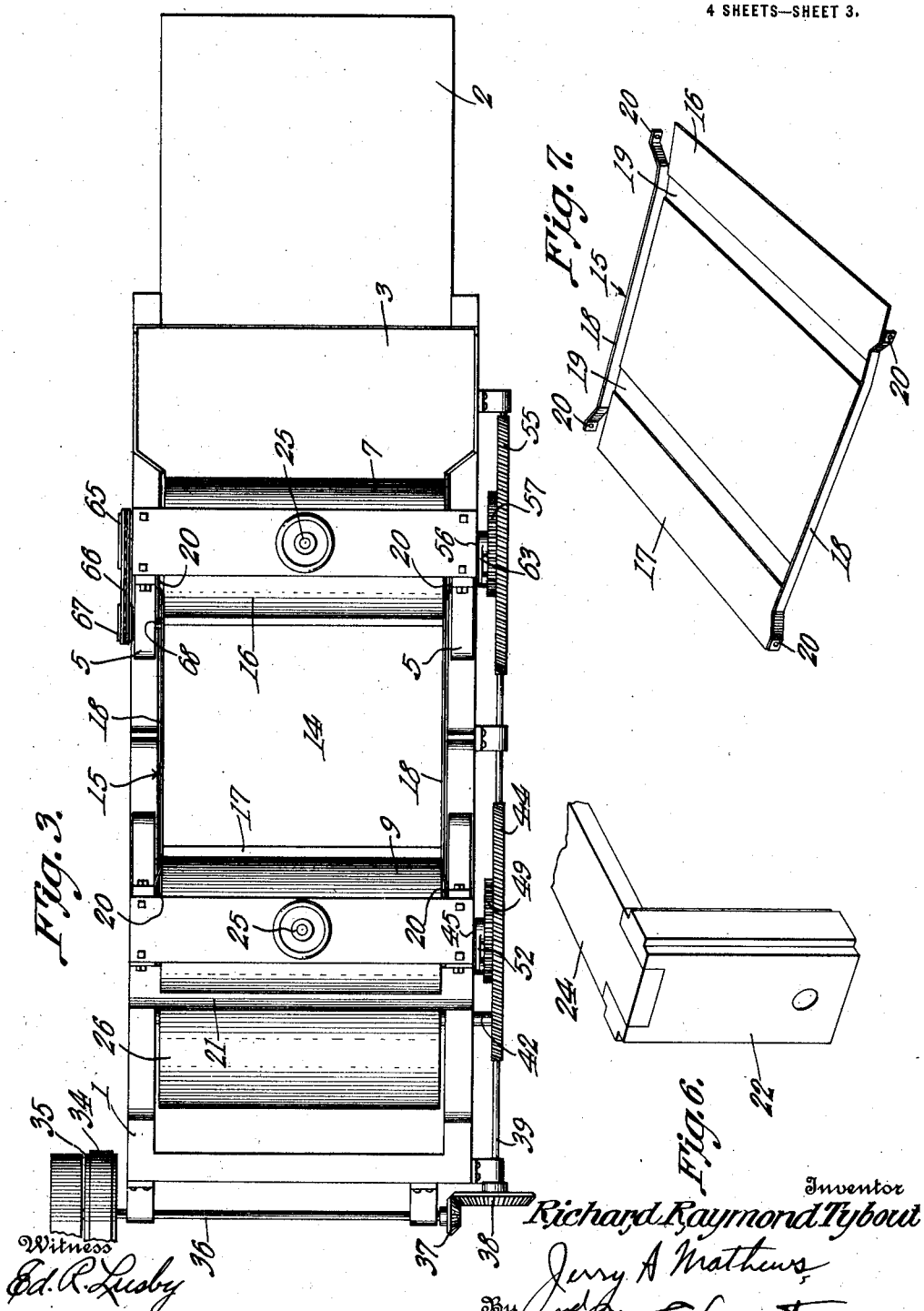

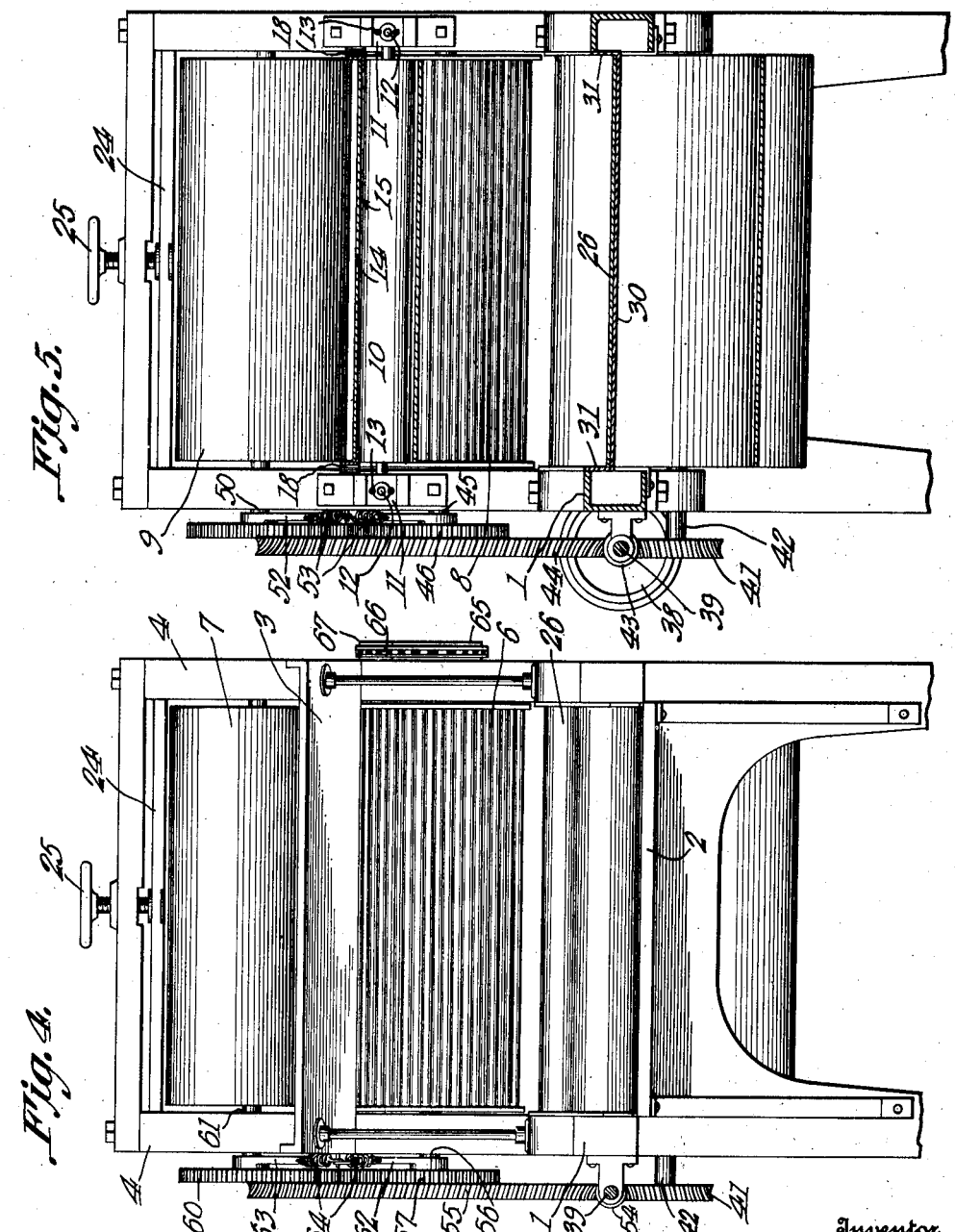

RICHARD RAYMOND TYBOUT, OF PHILADELPHIA, PENNSYLVANIA, ASSIGNOR TO GUANO & RAGGIO, INC., OF PHILADELPHIA, PENNSYLVANIA.

DOUGH-COMPRESSOR.

1,339,637.  Specification of Letters Patent.  Patented May 11, 1920.

Application filed August 11, 1919. Serial No. 316,853.

*To all whom it may concern:*

Be it known that I, RICHARD RAYMOND TYBOUT, a citizen of the United States, residing at Philadelphia, in the county of Philadelphia and State of Pennsylvania, have invented a new and useful Dough-Compressor, of which the following is a specification.

The object of my invention is to provide an improved dough compressing machine in which masses of dough are passed, between two sets of adjustable rolls. Such compression is necessary in preparing the unfermented or unraised dough used in the manufacture of macaroni, moxa, crackers, etc.

The object of the compression of the dough is to put it in a condition of uniform smoothness or texture, a condition of prime importance for the success of manufacture of the above named food products of the best grade.

It is further my object to provide improved and efficient means for adjusting various parts of the apparatus; to provide novel conveyers interposed between the two sets of rolls; and to provide improved means for applying the power and operating the various mechanism of the machine with a minimum number of gears, whereby to reduce the loss of power occasioned through friction where a multiplicity of gears are employed, as in certain machines heretofore used. It is also my object to provide the novel combinations and arrangements of parts hereinafter described and claimed, and illustrated in the accompanying drawings, in which—

Figure 1 is a side elevation of the entire machine;

Fig. 2 is a vertical longitudinal section through the center of the machine;

Fig. 3 is a top plan;

Fig. 4 is an end elevation;

Fig. 5 is a vertical cross section on line 5—5 of Fig. 1;

Fig. 6 is a detail perspective of members 24 and 22;

Fig. 7 is a perspective of conveyer supporting tray 15.

Like numerals designate like parts throughout the several views.

Referring to the accompanying drawings I provide a suitable main frame or table 1, mounted on legs 0, and having a suitable dough table 2, on which the masses of dough are placed after being received from the kneader, preparatory to treatment by the dough compressor. I provide a suitable elevated inclined feeding table 3, from which the dough is fed into the first set of rolls 6 and 7. Roll 6 is provided with a corrugated surface. I provide suitable uprights 4 on which the rolls are adjustably mounted, the lower roll of each set being rigidly mounted while the upper roll is vertically adjustable. Mounted on uprights 4 I provide brackets 5, supporting bearing blocks 11 on which the rolls 10 are mounted. I provide an endless or inner roll conveyer 14 mounted on rolls 10. Bearing blocks 11 are adjustably connected by rods 12 and the turnbuckle 13, by means of which the conveyer may be adjusted to maintain a taut condition. I provide a second set of rolls, 8 and 9, the lower discharge roll 8 being widely corrugated and the upper discharge roll 9 having a smooth face, as shown Fig. 5.

Mounted within inner roll conveyer 14 in position to afford a support for the portion of the conveyer on which the dough rests, I provide a conveyer supporting tray 15. Said tray has an inclined feed or entrance end or strip 15 projecting beyond the conveyer to bridge the space between the receiving end of the conveyer and the first set of rolls; and said tray is provided with a corresponding discharge end for guiding the dough as it passes from the conveyer to the second set of rolls. Tray 15 is further provided with side strips 18 adapted to keep the dough from falling off over the edge of the conveyer. Slots 19 are provided in tray 15, through which the conveyer travels. Side strips 18 terminate in flanges 20 by means of which the tray is suitably mounted on the uprights 4 or brackets 5, preferably. Spaced from roll 8 I provide a suitable dough guiding apron 21, whereby to guide the dough onto a return conveyer 26.

I provide vertically ribbed bearing blocks 22, as shown in Fig. 6, on which is mounted cross bar 24. A slot 23 is provided in uprights 4 to receive the ribbed portion of bearing blocks 22. To permit of adjusting cross bar 24 I provide a handwheel-operated screw swiveling in cross bar 24.

I provide a suitable return conveyer 26 mounted on suitable rolls 27 and 28. Roll 28 is mounted on a bearing block 29 which is adjustable by means of an adjusting screw 33 which makes it possible to keep the conveyer 26 in the desired top condition. To support the weight of the dough on return conveyer 26 I provide a suitable supporting plate or tray 30 having side flanges 31 turned upwardly to keep the dough on the conveyer. Tray 30 is suitably mounted on supports 32, as shown in Fig. 2.

Referring to Figs. 1-3, drive belt 34 operates a suitable drive pulley 35 mounted on a drive shaft 36 at one end of the machine and carrying the bevel gear 37. Meshing with gear 37 is a driven bevel gear 38 mounted on the driven shaft 39 extending longitudinally of the machine. I provide a suitable worm 40 on shaft 39 which meshes with worm gear 41 on shaft 42, which shaft carries the roll 27 that operates the return conveyer 26.

Spaced from worm 40 and threaded in a reverse direction, I provide a worm 43 meshing with the large worm gear 44 mounted on shaft 45, which shaft also carries the large discharge roll 8 and also the gear wheel 46. Member 46 is preferably a spur gear and is operatively connected with a coöperating gear wheel or spur gear 49 on shaft 50, which shaft also carries and operates the upper large discharge roll 9. It is within the contemplation of my invention to employ any suitable adjustable means for operatively connecting members 46 and 49 such as elongated teeth on those gears, a chain connection, or an adjustable interposed plurality of pinions which may be spring controlled. My preferred connection is illustrated in Fig. 1, in which a suitable pinion 47 mounted on the end of a pivoted link 51 meshes with spur gear 46 and with a corresponding upper pinion 48, which in turn is mounted on the end of a pivoted link 52, said upper pinion 48 meshing with spur gear 49. The respective links 51 and 52 are attached to springs 53 which automatically keep the pinion gears in operative engagement with the spur gears regardless of the adjustment of the latter relative to each other. The tension of the spur gears is suitably regulated by operating hand screw 25.

Spaced from worm 43 I provide a third worm 54 similarly threaded and meshing with the large spur gear 55 mounted on shaft 56, which shaft carries the lower receiving roll 6 and spur gear 57. Meshing with spur gear 57 is a pinion 58 mounted on pivoted link 62 and meshing with a similar pinion 59, mounted on a pivoted link 63, the pinion 59 being disposed to mesh with spur gear 60 which is mounted on shaft 61, said shaft being the one on which is mounted upper receiving roll 7. I provide springs 64 attached to links 62 and 63 and operating to permanently keep pinions 58 and 59 in engagement with each other and with spur gears 57 and 60 respectively.

Referring to Figs. 2 and 3 I provide a sprocket wheel 65 mounted on one end of shaft 56, driving a chain 66 which engages and drives a suitable sprocket 67, as shown in Fig. 3, on shaft 68, which shaft carries the adjacent roll 10 on which the conveyer 14 is mounted.

In operating the invention the mass of dough brought from the kneader and temporarily placed on table 2 is taken by the operator and placed on the inclined table 3 from whence it is fed into the first set of rolls 6 and 7 which compress it and drive it on to the inner roll conveyer 14, which transports it to the second set of rolls 8 and 9, having a different degree of corrugation of the lower roll, from whence the compressed dough is guided by guiding apron 21 upon the return conveyer 26 which carries it back to the table 2 where the operator may gather it up again and start it on another course through the machine; this procedure being repeated about three times to press the dough into the desired condition of uniform smoothness of texture which is essential. It will be observed that the machine is adjustable at various points as heretofore described in detail, and that it is operated automatically and the dough properly guided so as to require little attention from the operator and without loss of small pieces of dough which has been a defect of certain prior apparatus in this art. It will further be observed that the various mechanisms are connected with and operated from a single source of power with a minimum number of gears, and may be operated by a belt driven pulley from an electric motor.

What I claim is:

1. In a dough compressor, the combination of a fixed inclined dough feeding table, adjustable compressing rolls between which the dough is fed from said table, one of said rolls being corrugated, a second set of adjustable compressing rolls spaced a distance from the first set, one of said rolls being corrugated, and an endless conveyer extending between said rolls, whereby the dough may be fed from one set of rolls to the other and compressed to the desired degree with the use of only two sets of rolls.

2. In combination with the device described in claim 1, a supporting tray positioned under the main upper portion of the endless conveyer to afford a support for the dough thereon, said tray having slots near either end through which the conveyer belt travels, and means to guide the dough to and from the endless conveyer.

3. In combination with the device described in claim 1, rollers about which the endless conveyer passes, a turnbuckle device operatively connected with said rollers, said turnbuckle device being adapted to actuate each of the spaced conveyer rollers for longitudinally extending or shortening the conveyer.

4. In a dough compressing machine, the combination of a set of compressing rolls between which the dough is fed, one of said rolls being adjustable vertically relative to the other, a second set of rolls spaced from the first set, one of said second set of rolls being adjustable vertically relative to the other, an endless conveyer interposed between the said sets of rolls, a supporting tray arranged to support a portion of the conveyer while carrying the dough, a return conveyer having its receiving end positioned to receive dough discharged from the second set of compressing rolls, a similar supporting tray for said conveyer, and a table positioned to receive the dough from said return conveyer, said table being positioned in proximity to the first set of compressing rolls.

5. In combination with the apparatus described in claim 4, means for driving the two sets of rolls, means for driving the endless conveyer from one of the rolls, and means for driving the return conveyer, said mechanisms being driven from a single source of power.

6. In a dough compressor, the combination of a table, two sets of compressing rolls mounted on said table and spaced apart from each other, an endless conveyer interposed between said sets of rolls, means for supporting the conveyer under the weight of dough, an apron positioned to guide the dough as it is discharged from said compressing rolls, a return conveyer having its receiving end positioned to receive dough from the compressing rolls, a receiving table positioned to receive dough from the return conveyer, said table being positioned in proximity to the rolls into which the dough is first fed, and an inclined feeding table.

7. In a dough compressor, the combination of a set of dough compressing rolls adjustable relative to each other, one of said rolls being finely corrugated, a second set of rolls, one of said rolls being coarsely corrugated, the rolls being adjustable relative to each other, an endless conveyer interposed between said sets of rolls, and a tray arranged to support the portion of the conveyer carrying the dough, and having upturned sides to guide the dough, substantially as set forth.

RICHARD RAYMOND TYBOUT.